US 6,600,471 B2

(12) United States Patent
Lee et al.

(10) Patent No.: US 6,600,471 B2
(45) Date of Patent: Jul. 29, 2003

(54) PRECISE MOS IMAGER TRANSFER FUNCTION CONTROL FOR EXPANDED DYNAMIC RANGE IMAGING

(75) Inventors: Hae-Seung Lee, Bedford, MA (US); Charles G. Sodini, Belmont, MA (US); Keith G. Fife, Cambridge, MA (US)

(73) Assignee: SMaL Camera Technologies, Inc., Cambridge, MA (US)

( * ) Notice: Subject to any disclaimer, the term of this patent is extended or adjusted under 35 U.S.C. 154(b) by 204 days.

(21) Appl. No.: 09/916,822

(22) Filed: Jul. 27, 2001

(65) Prior Publication Data

US 2002/0043610 A1 Apr. 18, 2002

Related U.S. Application Data

(60) Provisional application No. 60/221,856, filed on Jul. 28, 2000.

(51) Int. Cl.$^7$ ................................................. G09G 3/36
(52) U.S. Cl. .............................. 345/90; 345/88; 345/89
(58) Field of Search ...................... 345/88, 89, 90–100, 345/204, 205, 690, 691

(56) References Cited

U.S. PATENT DOCUMENTS

| | | | |
|---|---|---|---|
| 5,055,667 A | 10/1991 | Sayag | |
| 5,187,581 A | 2/1993 | Kamatani | |
| 5,268,567 A | 12/1993 | Bowlby, Jr. et al. | |
| 5,283,426 A | 2/1994 | Bowlby, Jr. et al. | |
| 5,742,059 A | 4/1998 | Hassler | |
| 6,002,432 A | * 12/1999 | Merrill et al. | ............... 348/241 |
| 6,011,251 A | 1/2000 | Dierickx et al. | |
| 6,040,570 A | 3/2000 | Levine et al. | |
| 6,043,479 A | 3/2000 | Chiang | |
| 6,101,294 A | 8/2000 | McCaffrey et al. | |
| 6,130,713 A | 10/2000 | Merrill | |
| 6,215,113 B1 | 4/2001 | Chen et al. | |
| 6,243,134 B1 | 6/2001 | Beiley | |
| 6,246,436 B1 | * 6/2001 | Lin et al. | ..................... 348/308 |

FOREIGN PATENT DOCUMENTS

| | | |
|---|---|---|
| GB | 9823626.8 | 5/1999 |
| WO | WO 9949571 | 9/1999 |
| WO | WO 9966560 | 12/1999 |

OTHER PUBLICATIONS

Decker, "A Wide Dynamic Range CMOS imager with Parallel On–Chip Analog–to–Digital Conversion", Ph.D. Thesis, Sep. 1997, Massachusetts Institute of Technology, Cambridge, MA.

* cited by examiner

*Primary Examiner*—Richard Hjerpe
*Assistant Examiner*—Jean Lesperance
(74) *Attorney, Agent, or Firm*—Theresa A. Lober

(57) ABSTRACT

There is provided an imaging system including a MOS pixel array having a number, r, of rows of pixels. Each pixel of the array includes a light detecting element, a reset node connected to the light detecting element for controlling dissipation of photogenerated charge produced by the light detecting element, and a sense node connected to the light detecting element for measuring photogenerated charge produced by the light detecting element. A charge control voltage generation circuit is provided, having a topology for producing a plurality of charge control voltages selected to control dissipation of photogenerated charge produced by the light detecting element, in accordance with a corresponding pixel transfer function. A switch circuit is connected to the voltage generation circuit and to the pixel array to apply voltages produced by the charge control voltage generation circuit to reset nodes of pixels. The application by the switch circuit of each of the charge control voltages to a row of pixel reset nodes is characterized by a voltage application settling time, $t_s$, that is less than about 1/Nrf, where N is an integer and f is imager frame rate. This provides the ability to implement a desired transfer function, to expand imager dynamic range, in a manner that is immune to capacitances of the imager, by causing the voltage spikes, or glitches, associated with imager row capacitance, to decay substantially completely during the time over which an imager pixel row is accessed to apply a control voltage.

56 Claims, 7 Drawing Sheets

PRECISE MOS IMAGER TRANSFER FUNCTION CONTROL FOR EXPANDED DYNAMIC RANGE IMAGING

This application claims the benefit of U.S. Provisional Application No. 60/221,856, filed Jul. 28, 2000, the entirety of which is hereby incorporated by reference.

BACKGROUND OF THE INVENTION

This invention relates to MOS imagers, and more particularly relates to techniques for increasing the dynamic range of a MOS imager.

Conventionally, MOS imagers are characterized by a linear voltage-to-light response, or transfer function; that is, the imager output voltage is approximately linearly related to light incident on the imager. Specifically, the output voltage transfer function is linearly proportional to the intensity of the light incident on the imager. This linear transfer function can be characterized by a dynamic range, given as the ratio of the highest detectable illumination intensity of the imager to the lowest detectable illumination intensity of the imager. It is well understood that the dynamic range of the transfer function sets the overall dynamic range of the imager. If the dynamic range of a scene exceeds the dynamic range of an imager, portions of the scene will saturate the imager and appear either completely black or completely white. This can be problematic for imaging large dynamic range scenes, such as outdoor scenes.

Conventionally, a MOS imager pixel includes a phototransistor or photodiode as a light detecting element. In operation, e.g., the pixel photodiode is first reset with a reset voltage that places an electronic charge across the capacitance associated with the diode. Electronic charge produced by the photodiode when exposed to illumination then causes charge of the diode capacitance to dissipate in proportion to the incident illumination intensity. At the end of an exposure period, the change in diode capacitance charge is detected and the photodiode is reset. The amount of light detected by the photodiode is computed as the difference between the reset voltage and the voltage corresponding to the final capacitance charge. The illumination intensity that causes the photodiode capacitance charge to be completely dissipated prior to the end of the exposure period, thereby saturating the pixel, sets the upper end of the pixel dynamic range, while thermally generated photodiode charge and other noise factors set the lower end of the pixel dynamic range.

A variety of techniques have been proposed for expanding the dynamic range of a MOS imager. In one particularly effective technique, the voltage-to-light transfer function of the imager is modified to be a nonlinear function of illumination intensity, with transfer function slope increasing linearly as a function of illumination intensity. This transfer function modification is typically implemented as a photodiode capacitance charge control function within a CMOS imager pixel.

Specifically, in this technique, over the course of an exposure period a control voltage is applied to the photodiode capacitance to control charge dissipation from the capacitance. The charge control voltage is typically decreased from the starting pixel reset voltage value to, e.g., electrical ground, with each control voltage value at a given time during the exposure period setting the maximum charge dissipation of the photodiode. This control voltage decrease acts to increase the photodiode charge dissipation capability, whereby the pixel can accommodate a higher illumination intensity before saturating, and the dynamic range of the pixel is thusly increased. This charge dissipation control overrides the conventional linear voltage-to-charge transfer function of the pixel to produce a nonlinear transfer function, generally referred to as a compressed transfer function, and a correspondingly expanded dynamic range of the pixel and the imager.

Theoretically, the charge dissipation control voltage applied to a pixel photodiode is preferably continuously adjusted over the course of an exposure period. This enables the production of almost any desired transfer function compression characteristic. For many applications, this theoretical condition is not practical, however. Conventional MOS imagers include an array of pixel columns and rows and typically do not include pixel memory. Therefore, at the end of an exposure period each row of pixel values must be immediately read out. But in general, only one row of pixel values can be read out at a time. To accommodate this condition, the exposure periods of the pixel rows are typically staggered in a time sequence corresponding to the sequential pixel row read out. As a result, the desired pixel charge control voltage waveform must also be applied to the pixel rows in a staggered sequence; the same control voltage waveform is applied to every pixel row but is staggered in time between rows.

As a practical matter, given, e.g., a conventional VGA imager including 480 pixel rows, it would be difficult to deliver 480 continuous-time control voltage waveforms to the imager array or to generate 480 delayed versions of a single continuous-time waveform. It has been found that the approximation of a continuous-time control voltage waveform by a discrete-time, or stepped, control voltage waveform addresses this timing concern while enabling more flexibility and ease in control voltage generation and sequential delivery to a pixel array. In this technique, a desired continuous-time control voltage waveform, or transfer function compression curve, is approximated by voltage steps. This results in a finite number, e.g., eight, of distinct control voltage levels to be applied in a discrete manner to a pixel over the course of that pixel's exposure period. Conventionally, the prescribed discrete-time analog control voltages are generated off-chip from the imager array and then delivered to each pixel row on-chip in a staggered sequence controlled by, e.g., a digital controller. It has been found that this scenario enables good pixel control as well as timing control and additionally provides the ability to modify the transfer function compression characteristic.

It has been recognized that the discrete analog voltages produced to impose imager transfer function control preferably are regulated to be precise and noise free, and preferably are maintained free of glitches, where a "glitch" is here defined as a rapid excursion, or spike, in the voltage. Without such regulation, the desired compression function could be distorted, with the resulting images including noise or appearing unnatural. Regulation of the control voltages is particularly important as the voltages are switched from one pixel row to the next. Specifically, when a given control voltage is applied from one pixel row to the next, a voltage excursion, or glitch, is produced due to an inherent row switching capacitance. Such an excursion in a voltage source could cause rows of pixels already connected to that voltage to dissipate charge or accumulate charge in a manner not consistent with the desired transfer function.

For this reason, conventional imager configurations typically employ external, off-chip analog control voltage sources having output voltages that are bypassed by large and external bypass capacitors. The bypass capacitors are employed to eliminate glitches due to row switching capacitance as the charge control voltages are sequentially applied to rows of an imager. It has been understood that without the use of such bypass capacitors, a staggered-row control voltage application scenario does meet most imager performance requirements.

The typical row capacitance of a VGA imager is on the order of about 5 pF. In order to effectively reduce switching glitches from this row capacitance by an order of magnitude or more, bypass capacitors for each analog control voltage source are required to each be at least about 50 pF, and more typically are provided as an external capacitor or about 0.1 $\mu$F for each external analog voltage generation circuit. This external control voltage generation circuit configuration adds to imager system power consumption, complexity, cost, and overall imager system extent, and influences other imager performance factors. But practical implementation of a compressive MOS imager transfer function characteristic has heretofore required accommodation of the bypass capacitor configuration and the limitations imposed by this configuration.

SUMMARY OF THE INVENTION

The invention provides the ability to effectively and precisely implement a desired imager and pixel transfer function, to expand imager dynamic range, in a manner that is immune to capacitances of the imager. This is accomplished in accordance with the invention with an imaging system including a MOS pixel array having a number, r, of rows of pixels. Each pixel of the array includes a light detecting element, a reset node connected to the light detecting element for controlling dissipation of photogenerated charge produced by the light detecting element, and a sense node connected to the light detecting element for measuring photogenerated charge produced by the light detecting element. A charge control voltage generation circuit is provided, the circuit having a topology for producing a plurality of charge control voltages selected to control dissipation of photogenerated charge produced by the light detecting element, in accordance with a corresponding pixel transfer function. A switch circuit is connected to the voltage generation circuit and connected to the pixel array to apply voltages produced by the charge control voltage generation circuit to reset nodes of pixels. The application by the switch circuit of each of the charge control voltages to a row of pixel reset nodes is characterized by a voltage application settling time, $t_S$, that is less than about 1/Nrf, where N is an integer and f is imager frame rate.

This configuration causes the voltage spikes, or glitches, associated with the imager row capacitance, to decay substantially completely during the time over which an imager pixel row is accessed to apply a control voltage. As a result, the voltage spikes have no impact when a sequence of control voltages is applied to rows of an imager, e.g., when the switch circuit is configured to apply the voltages through the imager pixel rows sequentially. No bypass capacitors are therefore required, and the charge control voltage generation circuit can be fabricated quite compactly, preferably monolithically with the imager pixel array and switching circuit, e.g., in a CMOS fabrication process. Here all of the voltage generation and switch circuit elements can be fabricated in-line with the imager, e.g., with the switch circuit provided as MOS transistor switches.

In accordance with the invention, for applications in which charge control voltage application to pixel reset nodes is to be carried out across an imager array simultaneously, rather than row-by-row, the voltage spikes, or glitches, associated with the control voltages can be caused to decay substantially completely without impacting imager performance by requiring that the voltage application settling time, $t_S$, be less than about the duration specified for each of the control voltages in the plurality of control voltages.

The invention provides for embodiments in which the light detecting element of MOS imager pixels can be provided as, e.g., a photodiode, a phototransistor, or other suitable configuration. The reset node of the imager pixels can be provided as a MOS reset transistor. The sense node of the imager pixels is preferably connected to the light detecting element at a node corresponding to capacitance of the light detecting element.

In accordance with the invention, the charge control voltage application settling time, $t_S$, can be specified as $t_S = R_{th}C$, where $R_{th}$ is a Thevenin resistance of the charge control voltage generation circuit topology and C is an effective capacitance of the pixel array. To meet the requirement of the invention for causing voltage spikes to decay sufficiently rapidly, the Thevenin resistance, $R_{th}$, of the charge control voltage generation circuit topology, is preferably less than 1/NrfC, where $N \geq 2$.

The invention provides embodiments wherein the charge control voltage generation circuit topology includes a plurality of resistors, which in one preferable example are connected in series between two voltages. The resistors can be provided as monolithically fabricated polysilicon resistors for applications in which integration of the entire imager system is preferred. A voltage source and/or a current source can be included with the resistor network, and each can be provided as variable sources; it can be preferred to provide the current source as a transistor current source. In a topology including a series connection of resistors, the series can be connected between, e.g., a power supply voltage and electrical ground. Here a current source can be connected between one of the plurality of resistors and the power supply voltage or electrical ground. In other embodiments, the invention provides for a charge control voltage generation circuit topology that includes a digital register for each charge control voltage in the plurality of voltages, or that includes a sample-and-hold amplifier for each charge control voltage in the plurality of voltages.

It can be preferred for many applications to provide a charge control voltage generation circuit configuration such that at least one of the voltages produced by the circuit is a variable voltage. In one embodiment, each of the charge control voltages is a substantially constant voltage level. The plurality of voltages here produce a stepped sequence of voltage levels. Alternatively, the plurality of charge control voltages can together produce a substantially continuously-changing voltage level. For MOS photodiode-based imagers, it can be preferred to provide a stepped sequence of decreasing control voltage levels to increase the dynamic range of the imager. Imager dynamic range can particularly be increased by selecting the plurality of control voltage levels to impose a nonlinear transfer function on the imager pixels.

The imager system of the invention and the corresponding charge control voltage generation and application techniques enable a very efficient and elegantly non-complex imager system design and operation. By eliminating the need for large bypass capacitors, the system of the invention can be compactly fabricated, e.g., as a single monolithically-integrated system. This high degree of integration enables the use of the imaging system in a wide range of consumer and specialty photography, surveillance, robotic control, and other applications for which high performance, low cost, efficiency, and size are all preferred.

DETAILED DESCRIPTION OF THE INVENTION

Figure 1:
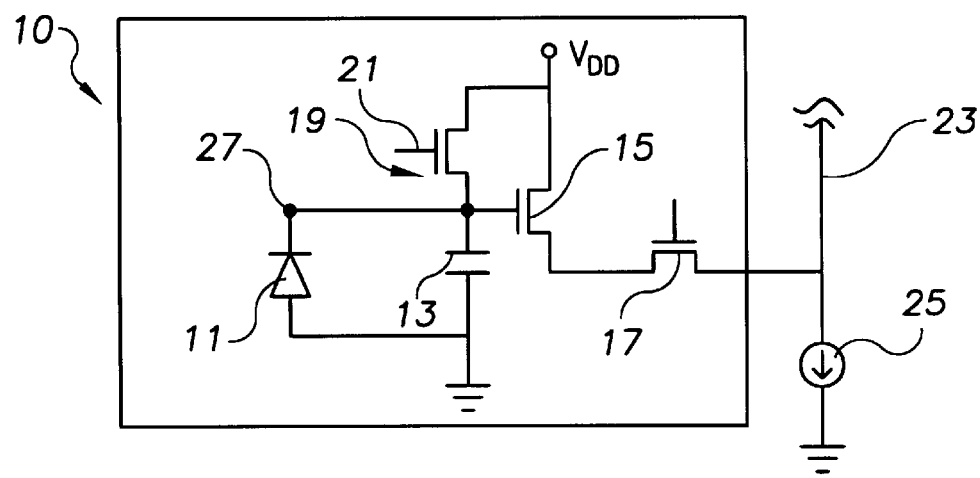
FIG. 1 is a schematic diagram of a pixel provided in accordance with the invention for enabling expanded imager dynamic range.

Referring to FIG. 1, the operation of a pixel 10 provided by the invention for enabling expanded dynamic range by application of stepped charge control voltages is described, FIG. 1 providing a schematic diagram of the pixel. This example pixel configuration employs a photodiode, but it is to be recognized that in general, the pixel can include other light collecting configurations, embodied as, e.g., a phototransistor, a photogate, or other selected configuration. In the current example, a photodiode 11 of the pixel produces a current of photogenerated electrical charge in response to light incident on the pixel. The resulting photocurrent is directed to a charge-sensing capacitor 13. The charge-sensing capacitor 13 is in practice provided as a collection of parasitic capacitances that are associated with a charge sense node 27 of the photodiode.

A MOS transistor 15 operates as a source follower that buffers the voltage on the capacitor 13 nondestructively to a column line 23 for read out of the voltage. Specifically, a row select MOS switch 17 activates the source follower transistor 15 when the particular row is selected to thereby enable the capacitor voltage measurement. When the row select MOS switch 17 of the row is turned on, and a current source 25 is connected to the source of the MOS transistor 15, the MOS transistor 15 and the current source 25 operate as a source-follower configuration to buffer the voltage on the photodiode capacitor 13 to the column line 23 for determining the capacitor voltage at the end of an exposure period, to in effect measure the photogenerated charge.

Figure 2:
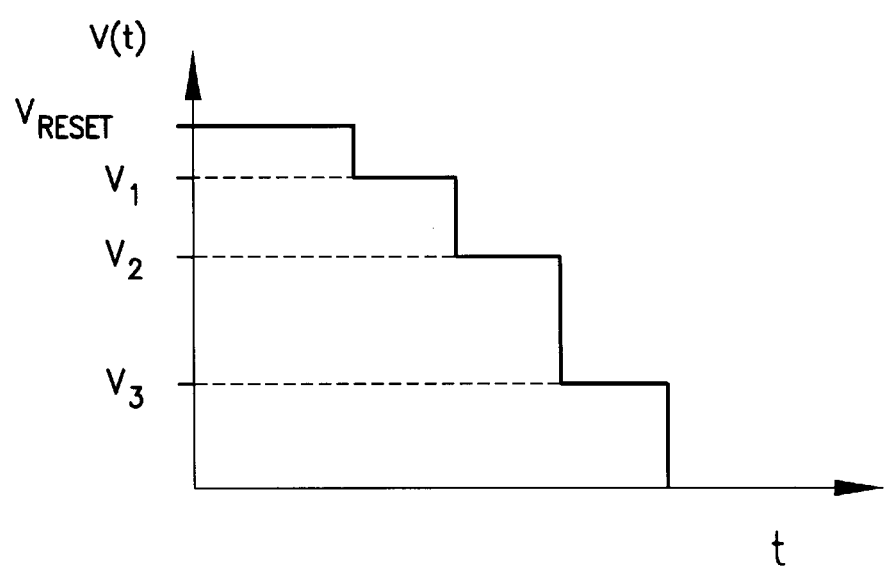
FIG. 2 is a plot of an example discrete-time charge control voltage profile, as a function of time, as provided by the invention.

Referring also to FIG. 2, a stepped, i.e., discrete-time, charge control voltage profile, V(t), is applied to the gate 21 of a reset transistor 19 of the pixel over the course of an exposure period for control of the charge dissipation from the photodiode capacitance. The gate 21 of the reset transistor 19 thereby operates as a reset node for delivering charge control voltages to the pixel photodiode. While this reset node is shown in this example as a MOS transistor gate, it is to be recognized that other reset node configurations can be accommodated by the control technique of the invention. For clarity of discussion, in the plot of FIG. 2 only three different control voltage step values, $V_1$, $V_2$, $V_3$, are shown along with the pixel reset voltage, $V_{RESET}$, but it is to be recognized that additional voltage levels can be provided as prescribed by a desired transfer function compression characteristic.

Figure 3:
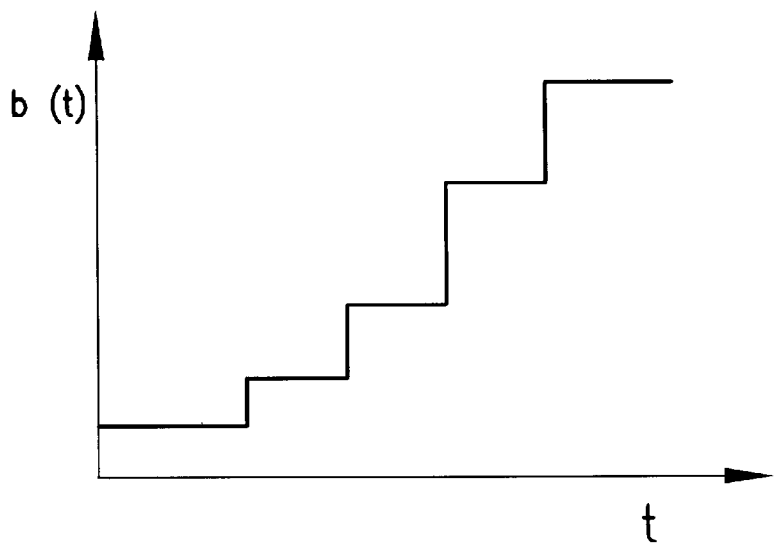
FIG. 3 is a plot of a pixel photodiode energy barrier profile produced by the voltage profile plotted in FIG. 2.
Figure 4:
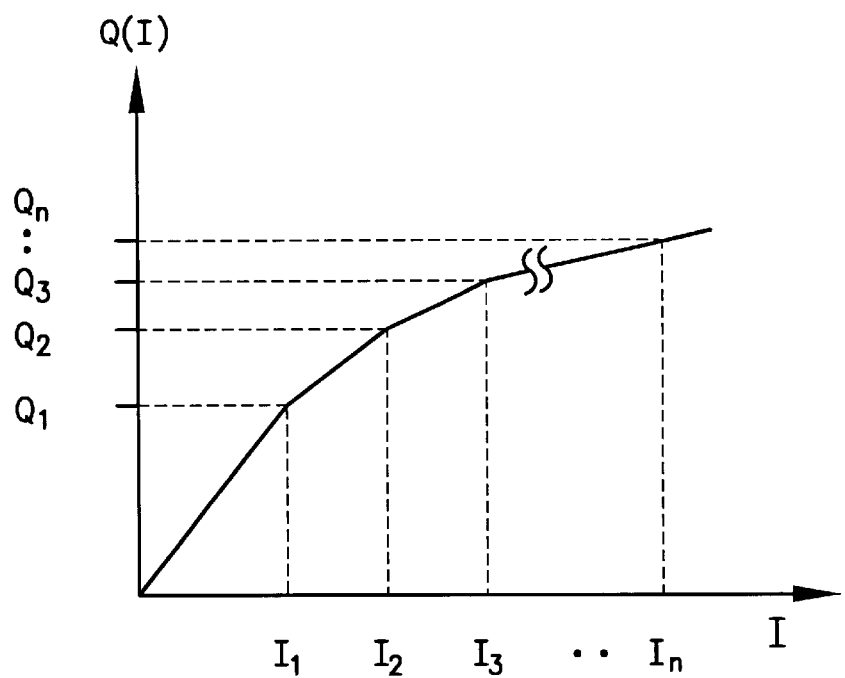
FIG. 4 is a plot of a pixel photodiode capacitance charge-to-illumination intensity function produced by the voltage profile plotted in FIG. 2.

FIG. 3 is a plot of the pixel photodiode charge dissipation energy barrier, b(t), as a function of time, that is produced by the charge control voltage profile of FIG. 2. FIG. 4 is a plot of the resulting charge-to-illumination intensity transfer function, or compression curve, that is produced by the charge control, here for a charge profile, Q(I) produced by a number, n, of illumination intensity levels, I. It is to be recognized that although the photodiode energy barrier profile, b(t), and charge compression curve, Q(I), are here plotted for clarity as increasing functions, in operation the photodiode capacitance voltage decreases over the course of an exposure period in the manner described above.

It can be seen from the plots of FIGS. 2, 3, and 4 that the discrete changes in photodiode energy barrier height produced by stepped charge control voltage as function of time give rise to a corresponding piecewise linear transfer function between the incident light intensity and the charge of the photodiode capacitor. The number of steps in the applied voltage profile and energy barrier height function thereby correspond directly to the number of piecewise linear sections in the charge-to-illumination intensity transfer function.

A typical CMOS imaging array in which the pixel of the invention can be implemented consists of pixel rows and columns; e.g., in a VGA CMOS imager, the pixels are arranged in a 640×480 array having 640 pixels in a row and 480 rows. The gates of reset transistors from the 640 pixels in each row can be provided as connected together at a point where the charge control voltage waveform is to be applied, whereby the waveform can be applied simultaneously to all pixels in a given row. The stepped control voltage waveform profile, like that of FIG. 2, is applied sequentially from the upper-most row to the bottom-most row of the pixel array, or is applied in another selected manner as-prescribed for a given imager operation.

In one scenario, each voltage is applied to successive pixel rows with a voltage application delay between rows equal to the frame period, divided by the number of rows. This sequential voltage application can be carried out, e.g., by a bank of switches, implemented as, e.g., MOS transistors, which connect the rows to appropriate charge control voltages in the manner described in detail below.

Employing conventional charge control voltage generation circuitry, it has been found that without large external bypass capacitors, spikes in the control voltage can occur as the voltage is applied from one pixel row to the next. The total capacitance per row presented to the voltage generation circuit is typically on the order of about 5 pF. As each pixel row is switched from one voltage step to another, the 5 pF row capacitance is also switched to a different voltage source. It is this capacitance switching that causes voltage spikes, or "glitches," in the applied control voltage if the voltage sources are not bypassed by large capacitors. As explained above, the positive voltage spikes are destructive because they prevent the pixel voltage from decreasing in response to the incident light, and thereby disallow the pixel from following the prescribed charge-to-illumination intensity transfer function.

Figure 5:
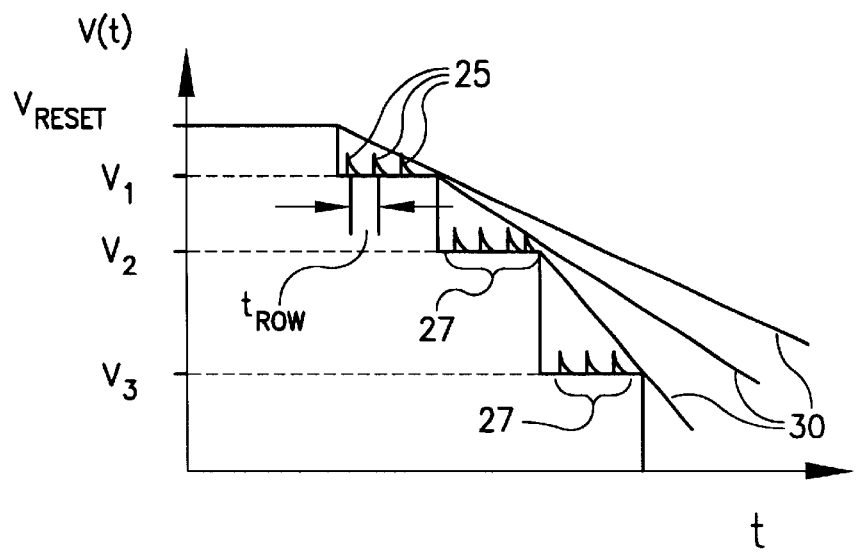
FIG. 5 is a reproduction of the voltage profile plot of FIG. 2, here also illustrating voltage spikes present in the voltage profile and the requirement of the invention that the voltage spikes remain below the highest illumination intensity not to be compressed by a given charge control voltage level.

Referring to FIG. 5, the control voltage profile plot of FIG. 2 is reproduced, here shown with voltage spikes 25 that are produced by pixel row switching capacitance. In the steady-state, the charge control voltage waveform profile exhibits voltage spikes 25 like that shown in the plot of FIG. 5. The voltage spikes are positive and of a magnitude that is determined by the number of pixel rows and the charge control voltage waveform profile. A sequence 27 of spikes is applied to each row as the rows are sequentially addressed, with each spike separated in time by the row access duration.

In accordance with the invention, a pixel charge control voltage generation circuit is provided that renders such voltage spikes, or glitches, harmless. Referring to FIG. 5, in accordance with the invention, the voltage generation circuit produces a waveform whereby any voltage spikes present at a given voltage level remain below a pixel voltage waveform value 30 that corresponds to the highest light intensity not to be compressed in that voltage step segment of the control voltage profile, in the manner shown in FIG. 5. In FIG. 5, example voltage spikes that have been controlled to meet this requirement by falling below pixel voltage waveform levels are shown, with the tangential lines 30 drawn from one edge of a voltage step segment to the next edge of a voltage step segment indicate the highest light intensity not to be compressed during that segment. This control technique disables a scenario wherein the pixel voltage waveform would be pulled up by the voltage spikes to result in incorrect photodiode charge dissipation. Any illumination intensity higher than that not to be compressed is automatically clamped by control voltages, whereby the voltage spikes have virtually no effect on compressed or uncompressed illumination intensities.

More specifically, as shown in FIG. 5, it is recognized in accordance with the invention that the temporal spacing between voltage spikes in steady state corresponds to the pixel row access time, $t_{ROW}$, and therefore, by controlling voltage spikes to substantially completely decay during this row access time, a voltage spike will have no impact as voltages are switched between rows. This control is imposed in the invention by controlling the resistor-capacitor (RC) time constant, or correspondingly, the settling time, $t_S$, of the charge control voltage application. Specifically, the RC time constant, or settling time, of the of charge control voltage application to a given pixel row is required by the invention to be less than, and preferably much less than, the pixel row access time, as:

$$t_S = R_{th}C < t_{ROW} \qquad (1)$$

where $R_{th}$ is the effective Thevenin resistance of the voltage generation circuit and C is the total capacitance of the entire pixel array that is presented to the control voltage.

As explained above, typically the pixel row access time is determined by the imager frame rate. The requirement of the invention for rendering the imager immune to voltage spikes can therefore be stated as:

$$t_s = R_{th}C < \frac{1}{rf} \qquad (2)$$

where r is the number of rows of the imager array and f is the imager frame rate being employed.

As an example of this technique, consider an imager frame rate of 30 frames/second employed with a VGA imager, having 480 rows. This scenario produces a pixel row access time of about 69 µs. The capacitance of such an imager is on the order of 5 pF×480 rows=2.4 nF for a 480 row VGA imager characterized by a 5 pF row switching capacitance. For this case, to meet the requirements of the invention as specified by Expressions (1) and (2) above, the effective Thevenin resistance of the charge control voltage generation circuit is preferably maintained no larger than 65 µs/2.4 nF=27 kΩ, and preferably is at least about 2–5 times less than this value, such that voltage spikes are controlled to decay faster than the pixel row access time and therefore be rendered harmless.

In accordance with the invention, this voltage application control can be adapted to the particular technique employed in a given imager for addressing each pixel row. The examples discussed above were directed to a row address technique in which each row is addressed separately in sequence, thereby requiring a staggered delivery of control voltages through the rows of an imager. In a further example, all pixel imager rows are addressed simultaneously, thereby eliminating a requirement for sequential pixel row addressing.

In this example, in order to control voltage spikes to decay sufficiently quickly to be rendered harmless, the invention requires that the settling time, $t_s$, of the simultaneous control voltage application to all of the pixel rows be less than the duration, $t_V$, for each of the n control voltages in the sequence of control voltages. In other words, the setting time of the charge control voltage application is given as:

$$t_S = R_{th}C < t_{V_i} \qquad (3)$$

for each of the 1 to n voltages, V, employed in the selected transfer function control. Referring back to the plot of FIG. 2, the duration, $t_V$, of each of the control voltages corresponds to the length of time during which the transfer function, V(t), is held at a given voltage level.

It is recognized that to implement this control technique as a practical matter, stepped, i.e., discrete-time, control voltages are to be employed. The use of continuous time, i.e., constantly changing, analog voltages would not be practical. However, the voltage control technique described previously, for use with sequential voltage application through rows of an imager, is not limited to the use of discrete-time voltages; continuous analog voltages can be there employed. For many applications, discrete-time voltages sufficiently approximate continuous-time voltages and can be more easily generated, and therefore are often preferred.

With the conditions of either of expressions (2) or (3) above met, no bypass capacitors are required of the voltage generation circuitry, and no particular care need be taken in the sequential or simultaneous pixel row access to inhibit voltage spikes; instead, in accordance with the invention, the charge control voltage application is carried out in a manner that is immune to the voltage spikes. This results in reduction in imager complexity and cost, and enables a particularly advantageous configuration in which the charge control voltage generation circuitry can be monolithically integrated on-chip with the imager array itself, in the manner described in detail below.

Figure 6A:
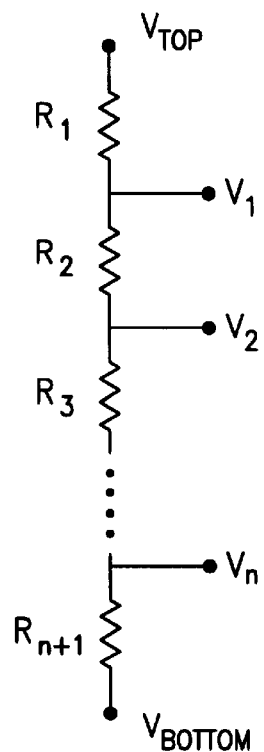
FIGS. 6A, 6B, and 6C are example resistor circuit implementations provided by the invention for producing charge control voltage levels in accordance with the invention.

A first example embodiment of a charge control generation circuit provided by the invention, which can be configured to produce a number, n, of barrier voltages $V_1$, $V_2$, ..., $V_n$, is schematically shown in FIG. 6A. A number, n+1, of resistors are connected in series between two voltages $V_{TOP}$ and $V_{BOTTOM}$. An output voltage tap is provided at selected locations in the resistor topology, e.g., between each of the resistors, to produce n tap voltages $V_1$, $V_2$, ..., $V_n$, corresponding to n charge control voltages to be supplied to each pixel to form a discrete-time charge control profile over the duration of the imager exposure period. Each of the n control voltages is then given as:

$$V_1 = V_{TOP} - \frac{R_1}{R_{TOTAL}}(V_{TOP} - V_{BOTTOM})$$

$$V_2 = V_1 - \frac{R_2}{R_{TOTAL}}(V_{TOP} - V_{BOTTOM})$$

.
.
.

$$V_n = V_{n-1} - \frac{R_n}{R_{TOTAL}}(V_{TOP} - V_{BOTTOM})$$

(4)

where $R_{TOTAL}=R_1+R_2+ \ldots +R_{n+1}$ The worst-case Thevenin resistance, $R_{th}$ of this circuit is found to be $R_{TOTAL}/4$. In order to remove the effect of voltage spikes in accordance with the invention, $R_{th}=R_{TOTAL}/4$ is therefore required to be implemented as a value below the imager row capacitance divided by pixel access row time. As stated above, in a typical VGA imager, this value corresponds to a Thevenin resistance of about 27 k$\Omega$. Thus, in accordance with the invention, $R_{TOTAL}/4$ should be no larger than about 27 k$\Omega$ and preferably is at least about 2–5 times less than this value such that the glitches decay faster than the pixel access row time.

Preferably, $V_{TOP}$ corresponds to the reset voltage $V_{RESET}$. In order to provide the greatest signal range for the pixel, $V_{TOP}$ preferably is kept as high as possible, e.g., close to the positive power supply voltage $V_{DD}$, or can even be implemented as a voltage source higher than $V_{DD}$ if a dc—dc converter is employed. It is also preferred that the charge control voltages generated preferably be quiet and stable, requiring both $V_{TOP}$ and $V_{BOTTOM}$ to be quiet and stable. Most imagers have two sets of power supply voltages; one set for analog functions and the other set for digital functions. In such imagers, analog $V_{DD}$ (AVDD) and analog ground (AGND) are quieter, and hence are preferred as sources for supplying the voltages $V_{TOP}$ and the $V_{BOTTOM}$, respectively. Alternatively, the voltage $V_{TOP}$ can be produced by stable voltage sources such as a bandgap voltage source or a Zener diode whose voltages are referenced to AGND. This embodiment renders $V_{TOP}$ and all produced charge control voltages independent of variations in AVDD. The drawback with this approach, however, is that the voltage $V_{TOP}$ must be lower than AVDD. A low-dropout type regulated voltage source can be employed to alleviate this drawback.

In accordance with the invention, the voltages produced by the voltage generation circuit, e.g., the circuit of FIG. 6A, are delivered to each pixel row of an imager array in sequence, following the pixel row access time requirements defined above. In one advantageous implementation, a digital shift register is employed to connect each pixel row to one of the analog control voltage levels. For example, an eight-bit digital shift register can be employed for controlling connection of a pixel row to one of eight analog charge control voltage levels. Preferably the row switch for making such connection is provided as a MOS transistor. A digital control rule is preferably implemented for connecting each pixel row to one of the generated voltage levels at a given time during the exposure period. As the shift register is advanced, the control voltages are applied to sequential pixel rows. A digital clock generator circuit is preferably employed to produce shift register timing control for sequential application of the voltages.

Figure 6B:
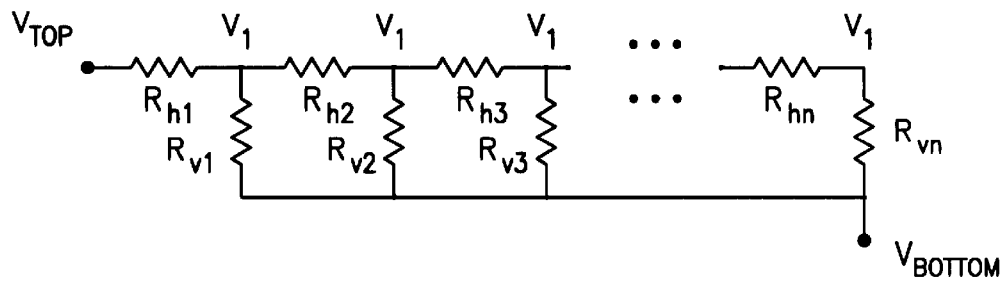
Figure 6C:
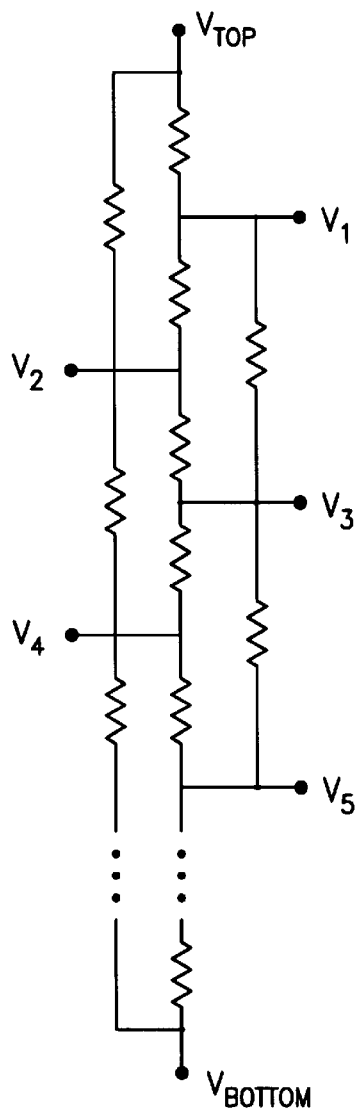

The invention contemplates a wide range of charge control voltage generation circuit configurations beyond that shown in FIG. 6A. FIGS. 6B and 6C are schematic drawings of alternative circuit configurations for producing a number of charge control voltage levels in a manner that enables control of the Thevenin resistance of the circuit. No particular circuit element connection topology or output voltage tap topology are required by the invention; rather, the equivalent Thevenin resistance of the circuit must meet the requirements for producing a settling time that is immune to charge control voltage spikes. Fixed-value circuit elements are also not required by the invention; for example, one of the voltage sources, e.g., $V_{BOTTOM}$, can be provided as an adjustable voltage source for enabling adjustment of the charge control voltages and their resulting compression function.

Figure 7:
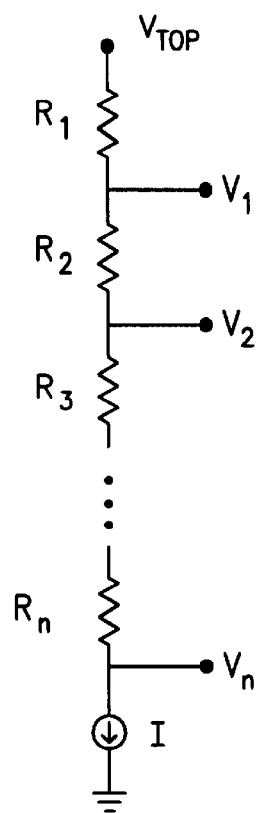
FIG. 7 is a first example resistor circuit implementation including a current source in accordance with the invention for producing charge control voltage levels in accordance with the invention.

A preferred example embodiment of the voltage generation circuit of the invention is schematically shown in FIG. 7. In this embodiment, shown for clarity as a series-connection of resistors, the bottom-most resistor $R_{n+1}$ is replaced by a current source, producing a current, I. It is to be recognized that other circuit topologies, such as those shown in FIGS. 6B and 6C, can also be employed here. The current source preferably is a transistor current source referenced to a silicon bandgap reference voltage or another stable voltage to maintain the current stable against power supply and temperature variations. Alternatively, the current source can be designed to have a non-zero temperature coefficient that cancels the temperature coefficient of the resistors. The charge control voltages produced by this circuit are given as:

$$V_1=V_{TOP}-IR_1$$

$$V_2=V_{TOP}-I(R_1+R_2)$$

$$V_n=V_{TOP}-I(R_1+R_2+ \ldots +R_n) \quad (5)$$

The worst-case Thevenin resistance, $R_{th}$, is in this case found to be $R_{TOTAL}=R_1+R_2+ \ldots +R_n$. In order to remove the effect of spikes in the charge control voltage application in accordance with the invention, $R_{TOTAL}$ is to be kept below the imager array row switch capacitance divided by pixel row access time. As stated above, in a typical VGA imager, this value corresponds to about 27 k$\Omega$. Thus, $R_{TOTAL}$ should be no larger than about 27 k$\Omega$, and preferably is maintained about 2–5 times less than this value for such an imager for controlling glitches to decay faster than the row time.

The advantage of this circuit embodiment of the invention is that any variation in $V_{TOP}$ causes the same variation to be produced in each of the charge control voltages. As a result, the differences between the reset voltage and control voltages are maintained constant regardless of variations in the voltage $V_{TOP}$. Typically, imager read-out circuitry employs a double sampling technique that subtracts the reset level from the measured output signal. This technique cancels the effect of the reset level changes due to any variation in the voltage $V_{TOP}$. In addition, with differences between the reset voltage and charge control voltages maintained constant, double sampling cancels the effect of charge control voltage variations caused by $V_{TOP}$ variations, as given in Expression (5). Therefore, the voltage $V_{TOP}$ can be directly connected to the positive power supply $V_{DD}$, reducing the complexity of the system considerably.

Another advantage of this embodiment is that the voltage levels produced by the circuit, and the corresponding compression function, can be easily adjusted by varying the current, I, following the rules of expression (5) above for producing voltages based on resistor values and the level of current. This adjustment of current can be carried out by the imager user in real time, e.g., as conditions of a scene change in a manner that makes adjustment of the imager transfer function desirable. An ability to change the imager transfer function on-the-fly can be particularly important for imager applications in which the dynamic range of the scene can change quickly. A circuit topology that includes a current source, as in the example circuit of FIG. 7, can therefore be preferred for many applications.

Figure 8:
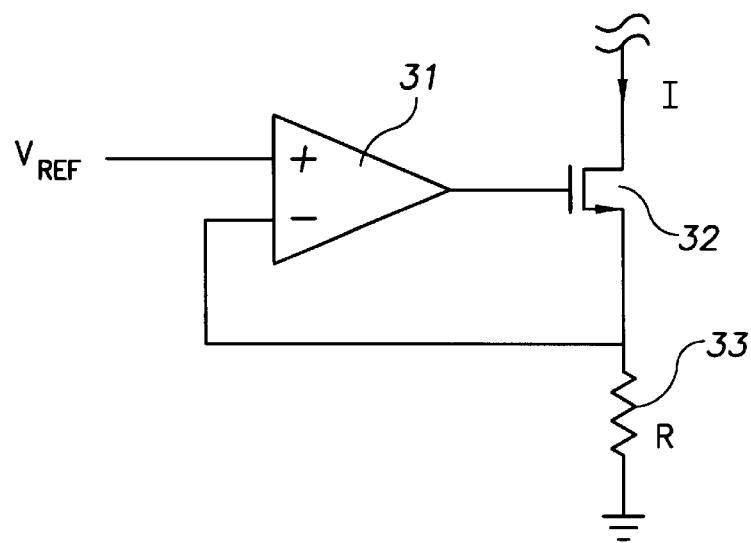
FIG. 8 is an example implementation of the current source of FIG. 7 in accordance with the invention.

An example embodiment of the current source employed in the circuit of FIG. 7 is schematically shown in FIG. 8. The voltage $V_{REF}$ is preferably provided by a silicon bandgap reference voltage or a Zener diode voltage. An operational amplifier 31, and a MOSFET 32 constitute a unity-gain negative feedback loop whereby the voltage across a resistor 33 is maintained at the voltage $V_{REF}$. Because the drain current of the MOSFET 32 is equal to its source current, the output current, I, of the current source is given as:

$$I = \frac{V_{REF}}{R} \qquad (6)$$

The resistor R is preferably fabricated as the same type of resistor configuration as $R_1$, $R_2$, ... $R_n$ of the voltage generation circuit so that the spacing between the barrier voltages depends only on matching between these resistors independent of temperature coefficient of the resistors, given that the temperature coefficients of the resistors cancel out. The output current I, of the current source can be varied by varying the voltage $V_{REF}$ if the adjustment of the compression function is desired.

Figure 9:
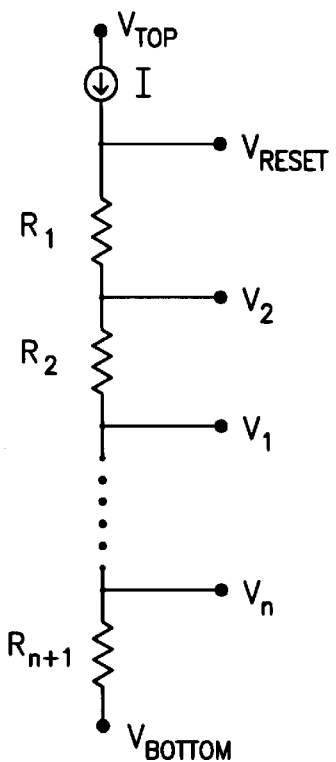
FIG. 9 is a second example resistor circuit implementation including a current source in accordance with the invention for producing charge control voltage levels in accordance with the invention.

A further example embodiment of a control voltage generation circuit provided by the invention is schematically shown in FIG. 9. This example illustrates that a current source can be configured at the "top" of the circuit, adjacent to the top voltage source, here the power supply, $V_{DD}$, with the bottom voltage source here provided as electrical ground. The advantage of this embodiment is that the current source effectively isolates noise in the power supply voltage and the charge control voltages are referenced to the quieter ground node. The disadvantage here is that the voltage at the top of the resistor network is required to be lower than the power supply voltage, $V_{DD}$, to produce a voltage drop across the current source that is sufficient for its functionality. But using a PMOS transistor, this voltage drop can be reduced to below about 200 mV, which is typically small enough to not significantly affect the signal range.

Figure 10:
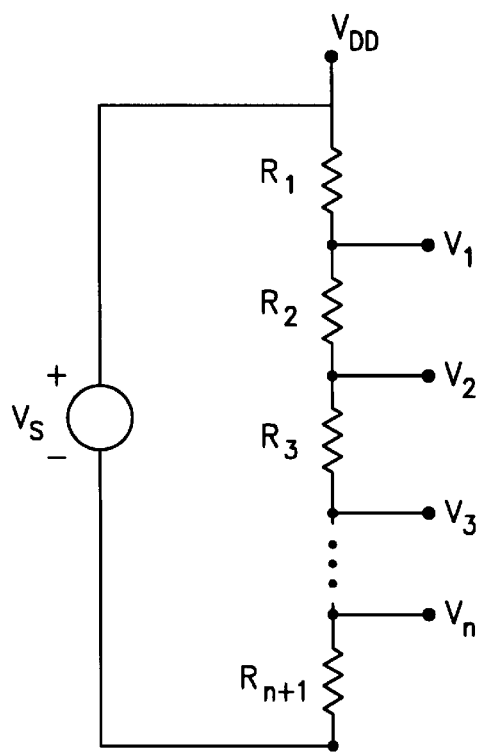
FIG. 10 is an example resistor circuit implementation including a voltage source in accordance with the invention for producing charge control voltage levels in accordance with the invention.

A further example embodiment of the charge control voltage generation circuit of the invention is schematically shown in FIG. 10. In this embodiment a voltage source, $V_S$, is referenced to the power supply voltage, $V_{DD}$, as the bottom voltage source, $V_{BOTTOM}$, while the power supply voltage, $V_{DD}$, is itself employed as the top voltage, $V_{TOP}$. Such a voltage source can be provided as, e.g., a band-gap reference based voltage source or a Zener diode.

Figure 11:
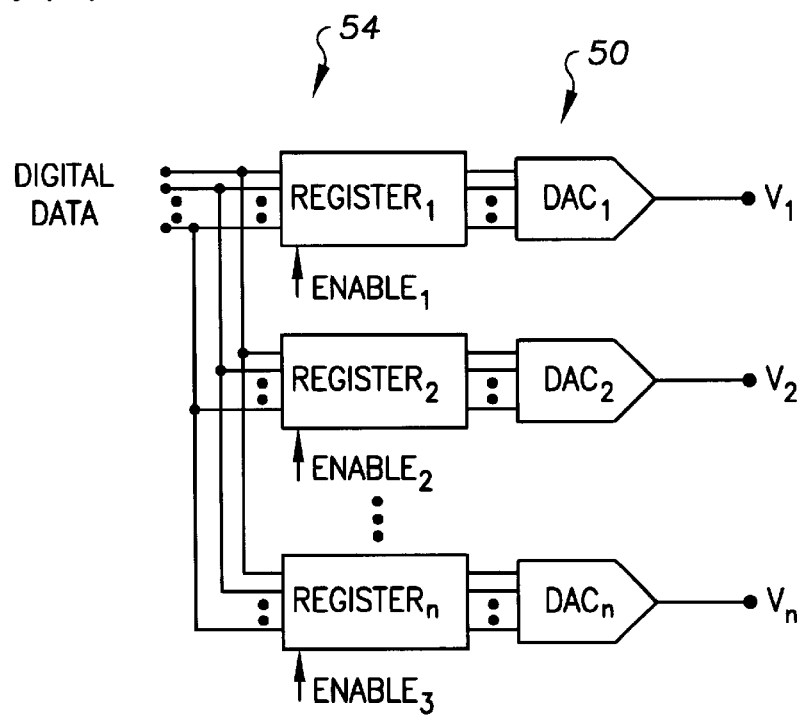
FIGS. 11 and 12 are example mixed digital and analog circuit implementations provided by the invention for producing charge control voltage levels in accordance with the invention by employing a digital register for each control voltage and a sample-and-hold amplifier for each voltage, respectively.

In a further example charge control voltage generation circuit embodiment shown schematically in FIG. 11, digital-to-analog converters (DAC's) are employed to generate the charge control voltages. In this embodiment, a number, n, of DACs 50 are employed to generate n independent control voltage levels. The prescribed voltage levels are programmed by storing the corresponding digital voltage value in digital registers 54 for the DACs. A given digital register to which a voltage value is to be written is enabled by the enable signal. Once the voltage value is stored in a register, the output of the corresponding DAC is set at the corresponding voltage determined by the data in the register. Although more complicated than other embodiments, this embodiment allows more flexibility in setting an charge-to-illumination intensity compression function because the DAC's can be programmed to produce different charge control voltages.

Figure 12:
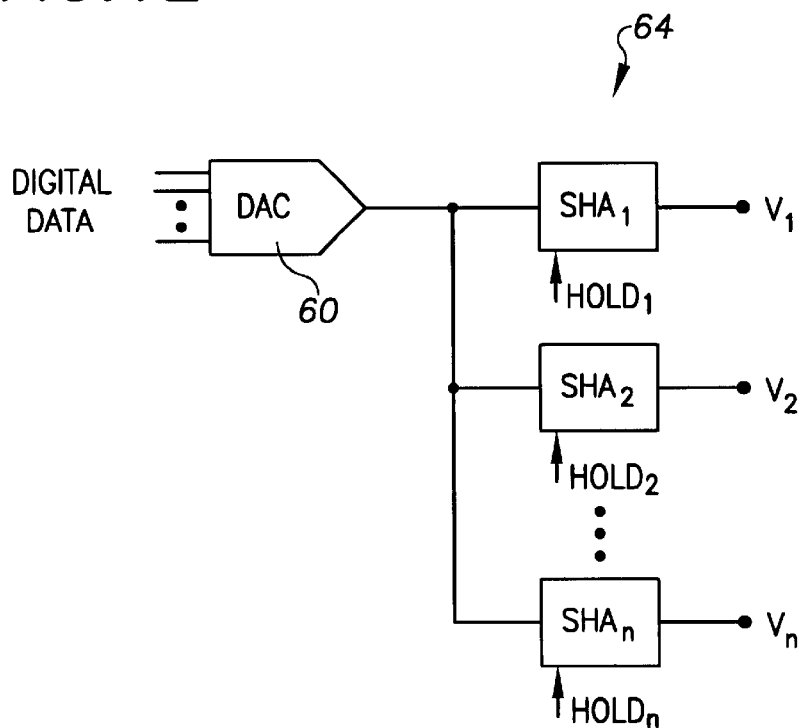

In a further circuit embodiment provided by the invention, shown schematically in FIG. 12, a single DAC 60 is employed with a number, n, of sample-and-hold amplifiers (SHAs) 64, corresponding to the number of charge control voltage levels to be produced. The DAC sequentially generates control voltages that are sampled and held in the SHAs as the hold signal is sequentially activated for the SHAs. This embodiment provides the capability of individually programming the control voltages without the complexity of multiple DAC's. For any digital embodiment of a control voltage generation circuit, it is preferred, as explained above, that the settling time of the voltage application be less than the pixel row access time such that voltage spikes in the control voltage cannot impact the charge control voltage profile.

Whatever circuit implementation is selected for generating the charge control voltage levels, it is preferred in accordance with the invention that the voltage generation circuit be fabricated monolithically, on-chip with the imager array. The substrate on which the imaging array and voltage generation circuitry are integrated can be provided as a silicon or other semiconductor substrate. Preferably, the substrate is compatible with CMOS fabrication processes, which can be preferred for producing a MOS imager and corresponding electronics. The resistors of the voltage generation circuitry preferably are fabricated as polysilicon resistors, produced by the MOS fabrication process. Monolithic integration of the voltage generation circuit is also advantageous in that such enables efficient monolithic integration of the digital voltage switching control circuitry described above. The invention therefore contemplates that for most applications, monolithic single-chip integration of an imager array with the voltage generation circuitry and switching circuitry is preferred.

The invention contemplates that monolithic integration of the imager array and voltage generation circuitry can optionally include monolithically-integrated bypass capacitors, if desired for a particular application, but such is not required, given the voltage spike control technique of the invention described above. It is a common practice to utilize unused areas of a chip for on-chip bypass capacitors for various circuit voltages which are desired to stay quiet. The invention does not inhibit following such conventional practice to bypass on-chip control voltages with on-chip capacitors. If such is carried out, however, caution must be exercised. While the addition of the on-chip bypass capacitors generally reduces the magnitude of glitches, such capacitors increase the RC time constant of the decay of glitches. Thus, to meet the requirements of the invention, the Thevenin resistance of the voltage generation circuitry must be made correspondingly smaller, following the considerations given above.

Fundamentally, as explained above, the invention does not require bypass capacitors and can most advantageously be employed by eliminating bypass capacitors. The voltage spikes, or glitches, associated with sequential charge control voltage application to pixel rows of an imager are controlled to substantially completely decay during the characteristic pixel array row access time. This control ensures that any glitches appearing in the control voltage waveforms will have no effect on pixel readout data. In accordance with the invention, this eliminates the need for large bypass capacitors for removing glitches in the conventional manner, and thereby enables monolithic integration of the voltage generation circuitry in a manner that was conventionally understood to not be feasible. It is recognized, of course, that those skilled in the art may make various modifications and additions to the voltage generation circuitry described above without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. An imaging system comprising:
    a MOS pixel array having a number, r, of rows of pixels, each pixel including a light detecting element, a reset node connected to the light detecting element for controlling dissipation of photogenerated charge produced by the light detecting element, and a sense node connected to the light detecting element for measuring photogenerated charge produced by the light detecting element;
    a charge control voltage generation circuit including a circuit topology for producing a plurality of charge control voltages selected to control dissipation of photogenerated charge produced by the light detecting element, in accordance with a corresponding pixel transfer function; and
    a switch circuit connected to the voltage generation circuit and connected to the pixel array to apply voltages produced by the charge control voltage generation circuit to reset nodes of pixels, application by the switch circuit of each of the charge control voltages to a row of pixel reset nodes being characterized by a voltage application settling time, $t_S$, that is less than about 1Nrf, where N is an integer and f is imager frame rate.

2. The imaging system of claim 1 wherein the charge control voltage generation circuit and the switch circuit are monolithically integrated with the MOS pixel array.

3. The imaging system of claim 1 wherein the pixel array, the charge control voltage generation circuit and the switch circuit are together monolithically fabricated as CMOS.

4. The imaging system of claim 1 wherein the pixel light detecting element comprises a photodiode.

5. The imaging system of claim 1 wherein the pixel light detecting element comprises a phototransistor.

6. The imaging system of claim 1 wherein the reset node comprises a gate of a MOS reset transistor.

7. The imaging system of claim 1 wherein the sense node is connected to the light detecting element at a node corresponding to capacitance of the light detecting element.

8. The imaging system of claim 1 wherein the charge control voltage application settling time, $t_S$, is given as $t_S = R_{th}C$, where $R_{th}$ is a Thevenin resistance of the charge control voltage generation circuit topology and C is an effective capacitance of the pixel array.

9. The imaging system of claim 8 wherein the Thevenin resistance, $R_{th}$, of the charge control voltage generation circuit topology, is less than 1/NrfC, where $N \geq 2$.

10. The imaging system of claim 1 wherein at least one of the voltages produced by the charge control voltage generation circuit comprises a variable voltage.

11. The imaging system of claim 1 wherein the charge control voltage generation circuit topology comprises a plurality of resistors and a voltage source.

12. The imaging system of claim 1 wherein the charge control voltage generation circuit topology comprises a plurality of resistors and a current source.

13. The imaging system of claim 12 wherein the current source comprises a variable current source.

14. The imaging system of claim 12 wherein the current source comprises a transistor current source.

15. The imaging system of claim 1 wherein the charge control voltage generation circuit topology comprises a series connection of a plurality of resistors between two voltages.

16. The imaging system of claim 15 wherein the charge control voltage generation circuit topology resistors comprises monolithically fabricated polysilicon resistors.

17. The imaging system of claim 15 wherein the two voltages of the charge control voltage generation circuit topology comprise a power supply voltage and electrical ground.

18. The imaging system of claim 17 wherein the charge control voltage generation circuit topology further comprises a current source connected between one of the plurality of resistors and electrical ground.

19. The imaging system of claim 17 wherein the charge control voltage generation circuit topology further comprises a current source connected between one of the plurality of resistors and a power supply voltage.

20. The imaging system of either of claims 18 or 19 wherein the current source comprises a variable current source.

21. The imaging system of claim 1 wherein the charge control voltage generation circuit topology comprises a digital register for each charge control voltage in the plurality of voltages.

22. The imaging system of claim 1 wherein the charge control voltage generation circuit topology comprises a sample-and-hold amplifier for each charge control voltage in the plurality of voltages.

23. The imaging system of claim 1 wherein each charge control voltage comprises a substantially constant voltage level, the plurality of voltages together comprising a stepped sequence of voltage levels.

24. The imaging system of claim 23 wherein the stepped sequence of constant voltages comprises a sequence of decreasing voltage levels.

25. The imaging system of claim 1 wherein the plurality of charge control voltages together comprise a substantially continuously-changing voltage level.

26. The imaging system of claim 1 wherein the pixel transfer function corresponding to the plurality of charge control voltages comprises a nonlinear transfer function.

27. The imaging system of claim 1 wherein the switch circuit comprises a plurality of MOS transistor switches.

28. The imaging system of claim 1 wherein the switch circuit connection to the pixel array is configured to apply the charge control voltages to rows of the pixel array sequentially.

29. An imaging system comprising:
a MOS pixel array including rows of pixels, each pixel including a light detecting element, a reset node connected to the light detecting element for controlling dissipation of photogenerated charge produced by the light detecting element, and a sense node connected to the light detecting element for measuring photogenerated charge produced by the light detecting element;
a charge control voltage generation circuit including a circuit topology for producing a plurality of charge control voltages selected to control dissipation of photogenerated charge produced by the light detecting element, in accordance with a corresponding pixel transfer function; and
a switch circuit connected to the voltage generation circuit and connected to the pixel array to apply voltages produced by the charge control voltage generation circuit to reset nodes of pixels, application by the switch circuit of each of the charge control voltages to the reset nodes of each of the pixels in the pixel array being characterized by a voltage application settling time, $t_S$, that is less than about a specified duration of each control voltage in the plurality of control voltages.

30. An imaging system comprising:
a MOS pixel array having a number, r, of rows of pixels, each pixel including a light detecting element, a reset node connected to the light detecting element for controlling dissipation of photogenerated charge produced by the light detecting element, and a sense node connected to the light detecting element for measuring photogenerated charge produced by the light detecting element;
a charge control voltage generation circuit including a circuit topology comprising a series connection of a plurality of resistors and a current source between a power supply voltage and electrical ground, for producing a plurality of charge control voltages selected to control dissipation of photogenerated charge produced by the light detecting element, in accordance with a corresponding pixel transfer function; and
a switch circuit connected to the voltage generation circuit and connected to the pixel array to apply voltages produced by the charge control voltage generation circuit to reset nodes of pixels, application by the switch circuit of each of the charge control voltages to a row of pixel reset nodes being characterized by a voltage application settling time, $t_S$, that is less than about $1/Nrf$, where N is an integer and f is imager frame rate.

31. A charge control voltage generation circuit for producing a plurality of charge control voltages selected to control dissipation of photogenerated charge, produced by a pixel of a MOS pixel array, in accordance with a corresponding pixel transfer function, the voltage generation circuit including a circuit topology that is characterized by a Thevenin resistance, $R_{th}$, that is less than about $1/NrfC$, where N is an integer, r is a number of rows of MOS pixels in the pixel array, f is pixel array frame rate, and C is an effective capacitance of the pixel array.

32. The charge control voltage generation circuit of claim 31 wherein at least one of the produced voltages comprises a variable voltage.

33. The charge control voltage generation circuit of claim 31 wherein the charge control voltage generation circuit topology comprises a plurality of resistors and a voltage source.

34. The charge control voltage generation circuit of claim 31 wherein the charge control voltage generation circuit topology comprises a plurality of resistors and a current source.

35. The charge control voltage generation circuit of claim 34 wherein the current source comprises a variable current source.

36. The charge control voltage generation circuit of claim 34 wherein the current source comprises a transistor current source.

37. The charge control voltage generation circuit of claim 31 wherein the charge control voltage generation circuit topology comprises a series connection of a plurality of resistors between two voltages.

38. The charge control voltage generation circuit of claim 37 wherein the two voltages of the charge control voltage generation circuit topology comprise a power supply voltage and electrical ground.

39. The charge control voltage generation circuit of claim 38 wherein the charge control voltage generation circuit topology further comprises a current source connected between one of the plurality of resistors and electrical ground.

40. The charge control voltage generation circuit of claim 38 wherein the charge control voltage generation circuit topology further comprises a current source connected between one of the plurality of resistors and a power supply voltage.

41. The charge control voltage generation circuit of either of claims 39 or 40 wherein the current source comprises a variable current source.

42. The charge control voltage generation circuit of claim 31 wherein the integer N is at least 2.

43. The charge control voltage generation circuit of claim 31 wherein each charge control voltage comprises a substantially constant voltage level, the plurality of voltages together comprising a stepped sequence of voltage levels.

44. The charge control voltage generation circuit of claim 43 wherein the stepped sequence of constant voltages comprises a sequence of decreasing voltage levels.

45. The charge control voltage generation circuit of claim 31 wherein the plurality of charge control voltages together comprise a substantially continuously-changing voltage level.

46. The charge control voltage generation circuit of claim 31 wherein the pixel transfer function corresponding to the plurality of charge control voltages comprises a nonlinear transfer function.

47. The charge control voltage generation circuit of claim 31 wherein the charge control voltage generation circuit topology is monolithically integrated with the MOS pixel array.

48. A charge control voltage generation circuit for producing a plurality of charge control voltages selected to control dissipation of photogenerated charge, produced by a pixel of a MOS pixel array, in accordance with a corresponding pixel transfer function, the voltage generation circuit including a circuit topology that is characterized by a settling time, $t_S=R_{th}C$, where $R_{th}$ is the Thevenin resistance of the circuit topology and C is an effective capacitance of the pixel array, the settling time being less than about a specified duration of each control voltage in the plurality of charge control voltages.

49. A method for controlling photogenerated charge dissipation in a pixel of a MOS imager pixel array to produce a selected pixel transfer function, the pixel array having a number, r, of pixel rows and operating at a frame rate, f, the method comprising the steps of:

generating a plurality of charge control voltages selected to control dissipation of photogenerated charge produced by the pixel in accordance with a corresponding pixel transfer function; and applying the generated charge control voltages to a reset node of the pixel during a pixel exposure period to control dissipation of photogenerated charge produced by the pixel, application of each of the charge control voltages being characterized by a voltage application settling time, $t_S$, that is less than about 1/Nrf, where N is an integer.

50. The method of claim 49 wherein the charge control voltages are generated by a charge control voltage circuit that is monolithically integrated with the MOS imager pixel array.

51. The method of claim 49 wherein the charge control voltage application settling time, $t_S$, is given as $t_S = R_{th}C$, where $R_{th}$ is an effective Thevenin resistance of a charge control voltage generation circuit from which the charge control voltages are generated, and C is the effective capacitance of the imager pixel array.

52. The method of claim 49 wherein the integer N of the settling time is at least 2.

53. The method of claim 49 wherein each charge control voltage comprises a substantially constant voltage level, the plurality of voltages together comprising a stepped sequence of voltage levels.

54. The method of claim 53 wherein the stepped sequence of constant voltages comprises a sequence of decreasing voltage levels.

55. The method of claim 49 wherein the plurality of charge control voltages together comprise a substantially continuously-changing voltage level.

56. A method for controlling photogenerated charge dissipation in a pixel of a MOS imager pixel array to produce a selected pixel transfer function, the pixel array including rows of pixels and operating at a frame rate, f, the method comprising the steps of:

generating a plurality of charge control voltages selected to control dissipation of photogenerated charge produced by the pixel in accordance with a corresponding pixel transfer function; and applying the generated charge control voltages to a reset node of the pixel during a pixel exposure period to control dissipation of photogenerated charge produced by the pixel, application of each of the charge control voltages being characterized by a voltage application settling time, $t_S$, that is less than about a specified duration of each control voltage in the plurality of control voltages.

* * * * *